June 14, 1932.                L. A. BEAN                1,862,653
                       ELECTRIC SOLDERING MEANS
                         Filed July 1, 1929

Inventor:
Louis A. Bean.
By Homer&Sweet
Attorney.

Patented June 14, 1932

1,862,653

UNITED STATES PATENT OFFICE

LOUIS A. BEAN, OF DENVER, COLORADO, ASSIGNOR TO IVAN L. BEAN, OF DENVER, COLORADO

ELECTRIC SOLDERING MEANS

Application filed July 1, 1929. Serial No. 375,034.

An object of this invention is to provide improved electric soldering means.

A further object of the invention is to provide an improved tool to be employed in electric soldering operations.

A further object of the invention is to provide an improved electrically-heatable tip in a soldering tool.

A further object of the invention is to provide improved means in an electric soldering tool for operatively connecting the electrically-heatable tip of said tool with a source of electrical energy.

A further object of the invention is to provide improved means in a soldering tool having a divided tip electrically-heatable through contact with the material to be soldered.

A further object of the invention is to provide an improved electric soldering tool having a tip in interrupted circuit with a source of electrical energy and electrically-heatable by closing of said circuit through contact of said tip with the material to be soldered.

A further object of the invention is to provide improved means in a soldering tool having an electrically-heatable tip whereby the degree of heat in said tip may be controlled through manipulation of said tip in contact with the material to be soldered.

A further object of the invention is to provide an improved electric soldering tool adapted to be employed with circuits of relatively low voltage.

A further object of the invention is to provide improved means in a soldering tool having an electrically-heatable tip for limiting the conduction of heat from said tip to the shank and handle of said tool.

A further object of the invention is to provide an improved electric soldering tool having great utility, high efficiency and low cost of manufacture.

My invention consists in the construction, arrangement and combination of elements hereinafter set forth, pointed out in my claims and illustrated by the accompanying drawing, in which—

Figure 1:
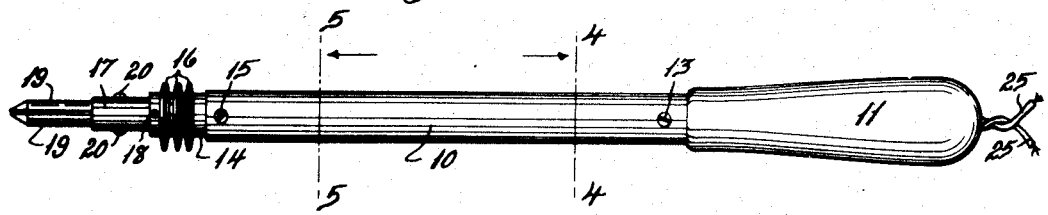
Figure 2:
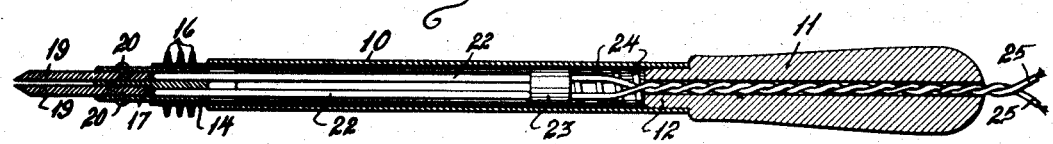
Figure 3:
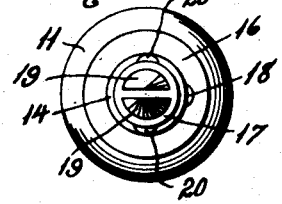
Figure 6:
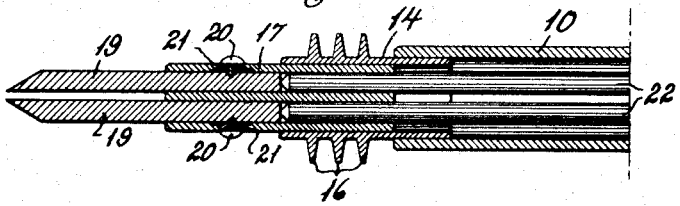
Figure 4:
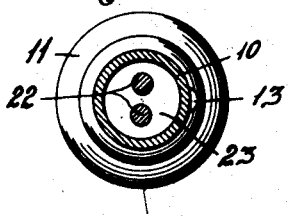
Figure 7:
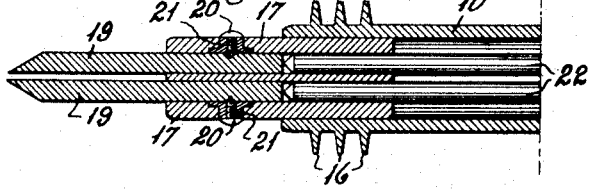
Figure 5:
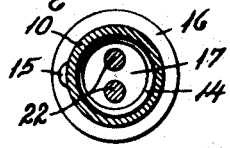
Figure 8:
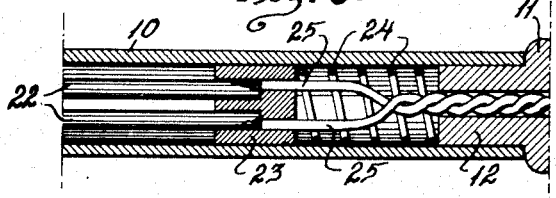

Figure 1 is a side elevation of my improved tool as assembled and connected for practical use. Figure 2 is a vertical, longitudinal section of the showing of Figure 1. Figure 3 is an end elevation, on an enlarged scale, of the showing of Figure 1. Figure 4 is a cross section, on an enlarged scale, on the indicated line 4—4 of Figure 1. Figure 5 is a cross section, on an enlarged scale, on the indicated line 5—5 of Figure 1. Figure 6 is a vertical, longitudinal section, on an enlarged scale, of the tip end of the improved tool. Figure 7 is a vertical, longitudinal section, on the same scale as and similar to Figure 6, of a modified construction of the tip end of the improved tool. Figure 8 is a fragmentary, longitudinal section of a portion of the shank and handle of the improved tool.

In the construction of the improved tool as shown, the numeral 10 designates a hollow, metallic shank open at each end and formed in any suitable manner and of any desired length, the pereferred form being tubular, as illustrated. A handle 11, preferably externally contoured to fit the human hand, is formed of non-heat-conducting material such as wood or the like and has a reduced portion 12 at one end of a size to fit snugly within one end of the shank 10, a screw or similar fastening 13 passing through one side of said shank and engaging the portion 12 of the handle 11 serving to lock said elements together and prevent relative movement therebetween. A hollow metallic sleeve 14 is slidingly received in the open end of the shank 10 opposite to the handle 11, said sleeve 14 extending within said shank a distance sufficient to provide for its firm support and being secured in the desired position by means of a screw 15 passing through one side of the shank 10 and engaging in or against the end of said sleeve within said shank. The sleeve 14 projects axially of and beyond the shank 10 and is formed with a plurality of spaced, annular ribs or flanges 16 on its outer surface for a purpose that will appear hereinafter. A cylindrical tip-holder 17 is formed of heat-resistant, di-electric material such as porcelain, fiber or the like, and of a size to be slidingly received within the bore of the sleeve 14, wherein said tip-holder is mounted and secured by means of a screw 18 passing through one side of said sleeve and engaging in or against said holder, the latter extending within said sleeve a distance equal to substantially one-half of its length. Similar, semi-circular bores are formed in and longitudinally of the projecting end of the holder 17 and have a depth equal to substantially one-half the length of said holder, said bores being of the same size and arranged with their flat sides in opposition adjacent a common diameter of said holder to approximate a single circular bore divided by a longitudinal partition diametrically of said holder, and tip halves 19, formed of commercial carbon or similar material heatable by the passage of electric current therethrough, each semi-circular in cross section, are mounted within the bores of the holder 17 and secured therein by means of screws 20 threadedly mounted through the sides of said tip-holder, or through metallic blocks 21 seated in the sides of said tip-holder, and engaging said tip halves. The arrangement of the bores in the tip-holder is such as to position the tip halves 19 with their flat sides in parallel, adjacent relation, and the outer ends of said halves are shaped to a common point, so that the assembled tip presents the appearance of a longitudinally bisected pencil projecting from the end of the holder 17, said holder serving to electrically insulate said tip halves from each other and from the metallic elements of the tool. A pair of metallic rods 22 are positioned in parallel relation within and longitudinally of the shank 10, one end of each rod 22 being received in and slidable relative to a bore in the tip-holder 17 registering with one of the tip holding bores above described, so that the corresponding ends of the rods 22 engage against and contact with the butts of the tip halves 19 within said holder, the contacting ends of said rods preferably being sharpened or rounded to insure good contact with said tip halves. The rods 22 are extended within the shank 10 in parallel, spaced relation toward the handle 11, but somewhat short thereof, and the ends of said rods adjacent said handle are received in spaced bores formed in a slidable block of dielectric material 23, loosely mounted for axial reciprocation in said shank 10. The bores in the block 23 in which the ends of the rods 22 are seated are formed with shoulders bearing against the ends of said rods and an expansible coil spring 24 is mounted within the shank 10 between the block 23 and the inner end of the handle 11, so that the pressure of said spring is exerted against said block and the rods 22 to position and hold said rods in close contact with the butts of the tip halves 19. Electric conductors 25 are secured to the ends of the rods 22 within the block 23 and extend through said block, within the spring 24 and through an axial bore in the handle 11, to a source of low voltage electrical energy, said conductors 25 naturally being electrically insulated from each other.

In the modification according to Figure 7, the construction of the tool is essentially and in principle the same as that above described, the only difference being that the flanges 16 are formed directly on the end of the shank 10 and the tip-holder 17 is mounted directly within the end of said shank, thus dispensing with the sleeve element 14.

The improved tool, when assembled and connected with a source of low voltage electrical energy as above described, is ready for practical use, no switch means other than that provided by the tool itself being required. It is obvious from the drawing and foregoing description, that an electric circuit is established through one of the conductors 25, a rod 22 and tip half 19, and back through the other tip half 19, rod 22 and conductor 25, whenever the gap between the said tip halves is bridged with an electrical conductor. Since all soldering operations are performed on metals susceptible of conducting electric current, all that is necessary when it is desired to employ the improved tool, when connected, is to touch the tip of the tool to the material to be soldered and rotate said tool until both of the tip halves 19 are in contact with said material, whereupon current will flow through the circuit thus established, heating the tip halves 19 and the portion of the material with which they are in contact, the tool then being usable to melt and spread solder on said material as desired. Since solder does not adhere to carbon, no tinning of the tip points is required and a very smooth flow of solder may be had through proper manipulation of the tool. The exact degree of heat required for any soldering operation can be very nicely adjusted by the operator by slightly rolling the tool to destroy the bridge between the two halves 19, thus breaking the circuit through said halves, and the bridging contact may be reestablished whenever desired and for as long as time as may be indicated, without in any way interrupting the work.

Since a relatively high heat is developed in the tip halves 19, the metallic portions of the tool may become highly heated by conduction and it is the function of the flanges 16 to check and radiate this heat and preserve a relatively low temperature in the shank of the tool. The flanges 16 preferably taper to the outer edges to enhance their radiating effect and may, of course, be provided in whatever number and arrangement is deemed most expedient for any size of tool.

It is of course obvious that various sizes and shapes of tip halves 19 may be employed with the improved tool and that other changes and modifications of form and construction of the elements of the tool may be had without departing from the spirit of the invention, hence I wish to be understood as being limited solely by the scope of the appended claims rather than by the specific illustrative showing and foregoing description.

I claim as my invention—

1. Electric soldering means comprising a manually-operable tool, a solder-working tip formed of semi-cylindrical counterpart members of electrically-heatable material supported in and projecting from one end of said tool, each of said counterpart members being electrically isolated relative to said tool and the other member and arranged with its plane surface in closely spaced parallelism with that of its counterpart member, and means for operatively connecting each of said counterpart members with a source of electrical energy.

2. Electric soldering means comprising a manually-operable tool, a bifurcated solder-working tip supported in and projecting from one end of said tool, said tip comprising counterpart semi-cylindrical elements of electrically-heatable material electrically-isolated relative to said tool and each other and arranged with their plane surfaces in closely spaced parallelism, and means for operatively connecting each of said tip elements with a source of electrical energy.

3. An electric soldering tool comprising a handle, a hollow shank secured to said handle, a single, solder-working tip formed of semi-cylindrical counterpart members of electrically-heatable material supported in and projecting from one end of said shank with their plane surfaces in closely spaced parallelism, said counterpart members being electrically insulated from said shank and from each other, and electrical connections through said shank and handle between each of said counterpart members and a source of electrical energy.

4. In an electric soldering tool having a handle and a hollow shank secured to said handle, a block of dielectric material supported in and projecting from one end of said shank, parallel bores in and opening through the projecting end of said block, counterpart semi-cylindrical tip elements of electrically-heatable material seated in and projecting in spaced, parallel relation from said bores to form a single, electrically-bifurcated, solder-working tip, and electrical connections through said shank and handle between each of said counterpart members and a source of electrical energy.

5. In an electric soldering tool having a handle and a hollow shank secured to said handle, counterpart, electrically-heatable tip elements supported in electrically-insulated, spaced, parallel relation in and projecting from one end of said shank, spaced, parallel, metallic rods longitudinally of and within said shank and each contacting one of said tip elements, a block of dielectric material loosely mounted within said shank and supporting adjacent ends of said rods in electrically-insulated relation, electrical connections through said shank and handle between each of said rods and a source of electrical energy and spring means within said shank and engaging said block of dielectric material to position and maintain the ends of said rods in intimate contact with their respective tip elements.

Signed at Denver, in the county of Denver and State of Colorado, this 19th day of June, 1929.

LOUIS A. BEAN.

CERTIFICATE OF CORRECTION.

Patent No. 1,862,653.  June 14, 1932.

LOUIS A. BEAN.

It is hereby certified that error appears in the printed specification of the above numbered patent requiring correction as follows: Page 1, line 15, after the syllable "vide" insert the word an; and in same line, for the words "means in a" read electric; same page, line 70, for the misspelled word "pereferred" read preferred; and that the said Letters Patent should be read with these corrections therein that the same may conform to the record of the case in the Patent Office.

Signed and sealed this 22nd day of November, A. D. 1932.

(Seal)
M. J. Moore,
Acting Commissioner of Patents.